INVENTORS.

INVENTORS.

Patented Nov. 4, 1947

2,430,005

UNITED STATES PATENT OFFICE 2,430,005

DIFFERENTIAL HEAT TREATING

Francis S. Denneen, Cleveland, and William C. Dunn, Shaker Heights, Ohio, assignors to The Ohio Crankshaft Company, Cleveland, Ohio, a corporation of Ohio Application June 1, 1942, Serial No. 445,533

7 Claims. (Cl. 148—10)

The present invention, relates as indicated to apparatus for the heat treating of metallic articles. It is directed chiefly to mass production of hardened articles, and is applied principally to such articles as projectiles.

Pieces differing as to material and form as well as size require different heating to obtain equivalent results. Similarly the material, form and size affect the results of quenching. It is desirable in some cases that heat treating apparatus be readily adaptable to being changed over in part without being changed over in whole, i. e., it may be desirable to change the size of one heating station without changing any of the others and at the same time it should be possible to change the quenching rate without changing either the inductor or the rate of heating. The present apparatus makes possible the accurate duplication of parts regardless of size or form. This invention is particularly adapted to the mass production of hardened articles such as projectiles, particularly armor piercing shells or shot. In articles of this class it is generally required that hardness shall vary from one part to another of the article according to a predetermined pattern, that this variation of hardness shall be accurate and that the operation of hardening shall be accomplished rapidly and economically, both in regard to space employed and power and labor consumed.

In the hardening of a projectile such as an armor piercing shot, the point of the shot must be sufficiently hard so as not to flatten unduly when it strikes the armor plate. The shot must possess suitable physical qualities to be capable of being fired through the plate and without shattering at the initial impact.

In many cases it is desirable that the base of the shot be soft or in a substantially annealed condition in order to satisfactorily pierce the armor plate. Shot with fully hardened bases have a tendency to break apart or shatter at the base when fired into armor plate, while similar shot with softer or annealed bases fired under exactly the same conditions will pass through the armor plate without breaking apart. By leaving the base unhardened or by drawing it after hardening, it is possible to cut the band groove, drill and perform other machining operations on the base of the shot subsequent to the hardening operation. It is important that the hardness of the shot be properly graduated from the nose back toward the base, and from the external surface into the center of the body to insure the best results under firing test. It is well known that under firing tests, a properly heat treated shot will cleanly pierce through a piece of armor plate when traveling at a lower velocity at the instant of impact than would an improperly heat treated shot. Properly heat treated shot, therefore, is effective at a greater range or may be effectively fired at a lower muzzle velocity.

Heretofore articles of this kind have been heated entirely through to produce required hardness and as a result quenching strains are set up which cause incipient fractures and result in the projectile being broken partly through even before striking the armor plate and thus upon impact, the projectiles breaks or even shatters into small pieces before penetration can occur.

The present method and apparatus have been developed so that such fractures can be avoided. The projectile can be made of material which will give a strong, tough core not susceptible to fracture, and at the same time the outer part can be treated to provide a high degree of hardness to insure the projectile against excessive flattening or other deformation or breakage upon impact with hardened armor or other material.

To accomplish the above desired results we have found it necessary to develop inductors of new form, and to arrange these inductors in new combinations and to provide a new method of quenching the articles after the same have been heated.

In the manufacture of shot in which there is a band groove near the base and a recess within the base, a serious difficulty is frequently met where the entire body of the shot is hardened, because of a tendency for cracks to form at the band groove, these frequently leading into the base recess.

The principal object of this invention, therefore, has been to provide apparatus adaptable to simultaneously heat treat several articles of the same size and form. Another object has been to provide apparatus which can be readily changed over from one form to another so as to heat treat articles of various forms and sizes. A further object has been to provide means to distribute heating along a surface zone of an article in accordance with desired results. A still further object has been to provide means for concentrating the quenching effect in desired locations. Another object has been to provide a compact device readily accessible and one which does not require highly skilled labor for its operation. Another object has been to provide a method of hardening which is adaptable to various types and forms of articles and which provides for varying the results according to prescribed requirements. A still further object has been to provide mechanism adapted to harden such parts of a projectile as are required to be hard and to harden those parts sufficiently to provide desired armor piercing ability without harmful effects to the hardness already provided in other parts. Another object is to provide means and method to produce a desired change in hardness from one part of the article to another. A still further object is to provide a projectile having an extremely hard point, a tough core and a relatively soft base section. Other objects will become apparent from the following description.

To the accomplishment of the foregoing and related ends said invention consists of the means and method hereinafter described together with the article produced thereby, all of which are particularly pointed out in the claims. The annexed drawings and following description set forth in detail certain means and one mode of carrying out the invention and include one form of the product produced thereby. Numerous other modifications may be adapted without departing from the scope of the invention. The phraseology employed is for the purpose of explanation and not for limitations, the claims hereto appended pointed out those parts of the invention which are regarded as novel.

Figure 1:
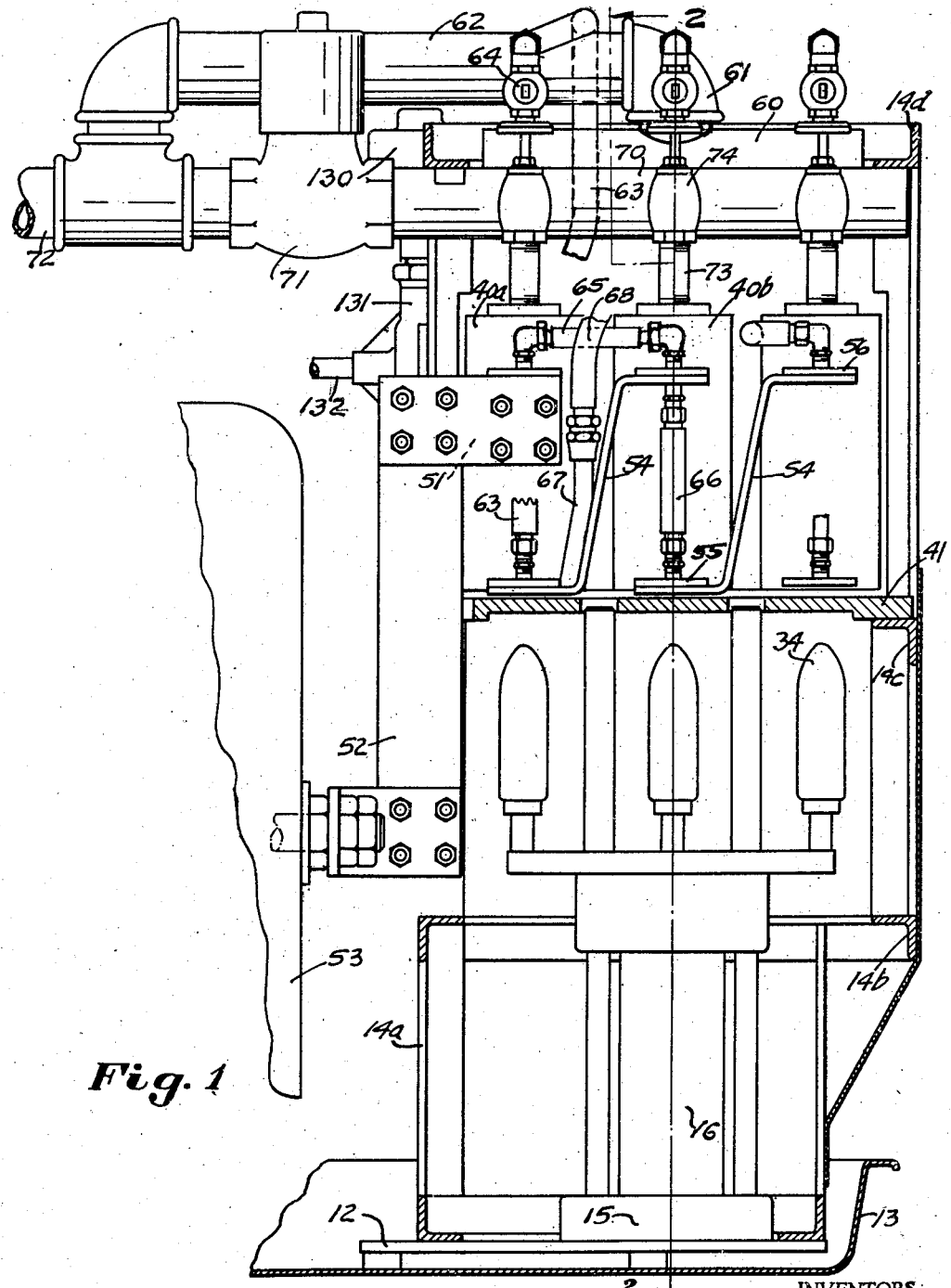
Fig. 1 is a side elevation, partly in section of the complete apparatus.
Figure 2:
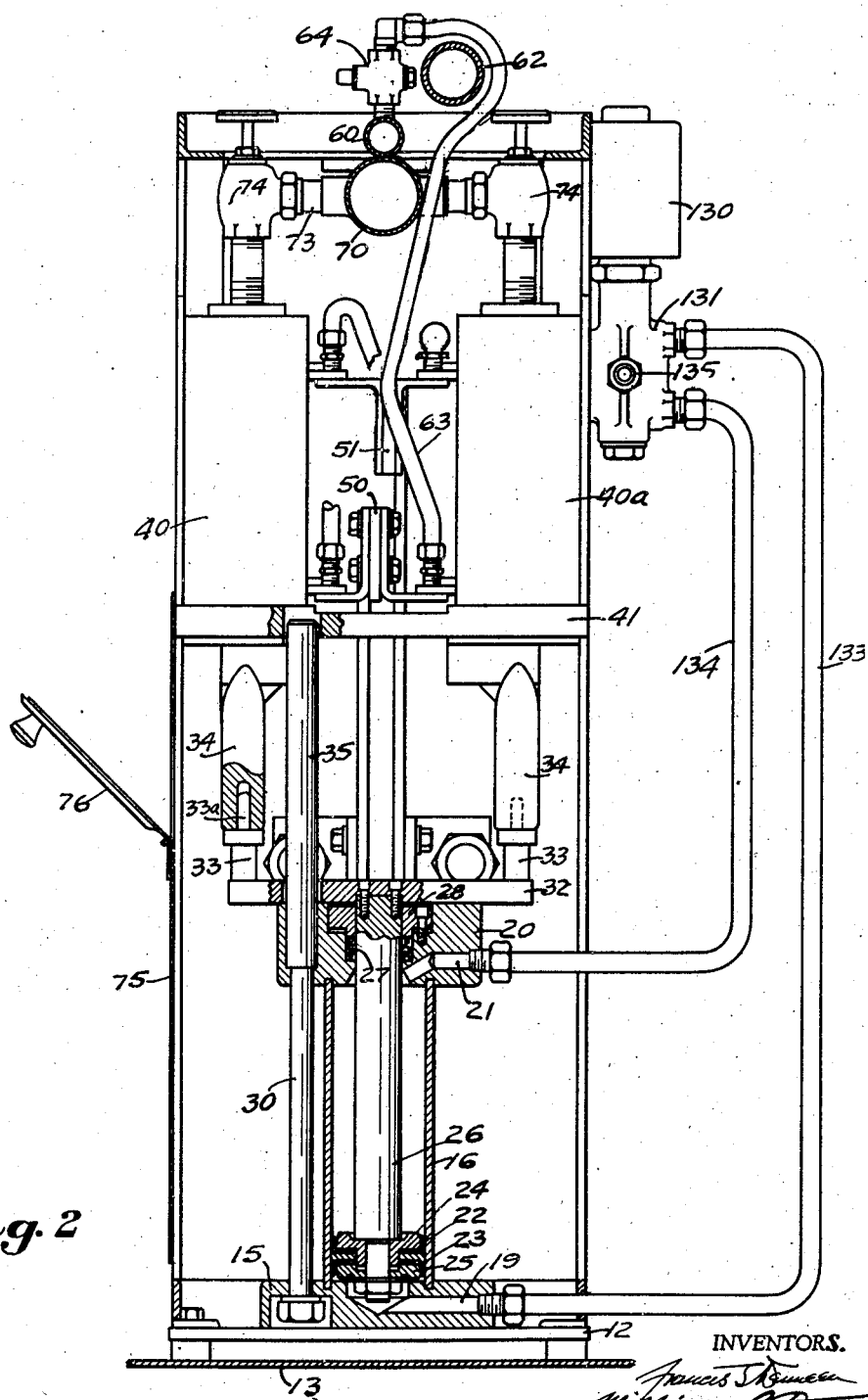
Fig. 2 is an end elevation partly in section of said apparatus.

Referring now to the apparatus illustrated particularly in Figs. 1 and 2 of the drawings, it will be observed that the mechanism as assembled is supported on a base 12 which is carried in a liquid collecting sink or basin 13. This mechanism has a frame preferably made of angle iron or other structural shapes such as members 14a, 14b, 14c and 14d. In Fig. 2 base 12 carries a hydraulic cylinder structure comprising the lower head 15 into which is recessed the lower end of the tubular cylinder 16 and having an inlet supply passage 19 for the piston operating fluid, which passage also serves as a discharge passage for this fluid. The cylinder cover 20 comprises a passage 21 which serves as a fluid inlet and discharge for the upper end of the cylinder. Operating within the cylinder is the piston structure comprising leather cups 22 and 23 held in assembled relationship by means of clamping members 24 and 25 and piston rod 26. Packing 27 and gland 28 are provided to seal the passage for the piston rod thru cylinder cover 20. The cylinder base 15 and cover 20 are held in firmly assembled relationship with cylinder 16 by means of rods 30.

Attached to the upper end of piston rod 26 is the carrier plate 32 having a group of supports 33 with pins 33a for locating and carrying the projectiles 34 or other articles to be heat treated, the pins being adapted to enter the base recesses. Guide portions 35 of rods 30 passing thru the cylinder cover 20 serve as means to hold the carrier plate 32 and the piston rod 26 from rotating and thus insure that the parts 34 to be heat treated move straight and in the required direction and into correct heating position.

Figure 3:
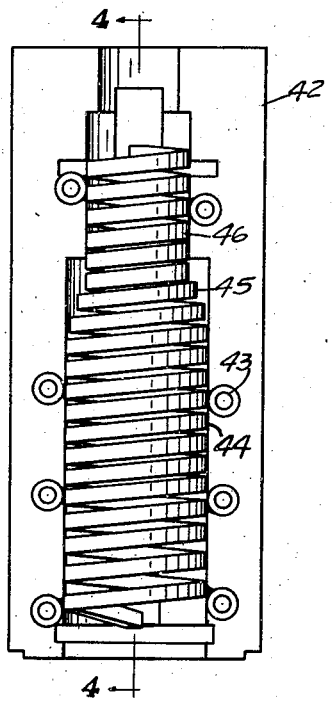
Fig. 3 is an elevation of the coil employed as an inductor and is shown on a scale somewhat larger than the scale of Figs. 1 and 2.
Figure 4:
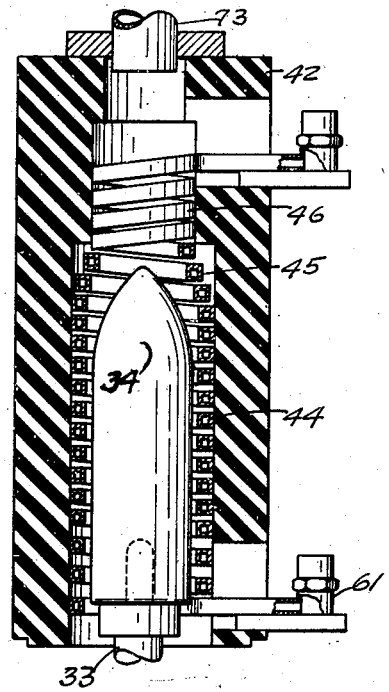
Fig. 4 is an elevation of one form of article to be heat treated with a part of the inductor and supporting mechanism surrounding it shown in section.

Directly above each of the pins 33a is an inductor assembly 40. These inductor assemblies of which six are shown in the present case, are carried on plate 41 and comprise complimentary insulating enclosure members such as 42 between which each inductor is securely clamped by bolts 43 as shown in Figs. 3 and 4. These members 42 are made of heat resisting electric insulation such as Transite, a Portland cement-asbestos combination and serve as heat insulation and as means for preventing the inductors from coming into current conducting contact with surrounding metallic parts. The inductors are formed to correspond in shape generally with the article to be heat treated. For the article herein illustrated, each inductor is wound from rectangular copper tubing into coils forming a substantially cylindrical helix 44 which helix is joined by a somewhat conical section of coils 45 to another group of coils 46 in the form of a smaller cylindrical helix lying thereabove to provide a continuous conductor thru which all the inducing current passes. The tapered or conical portion and the small cylindrical part of the inductor lying adjacent to the point or piercing end of the projectile causes a highly concentrated flux field in and adjacent to this point which heats the piercing end of the projectile more rapidly than other parts, quickly bringing it to hardening temperature.

Figure 5:
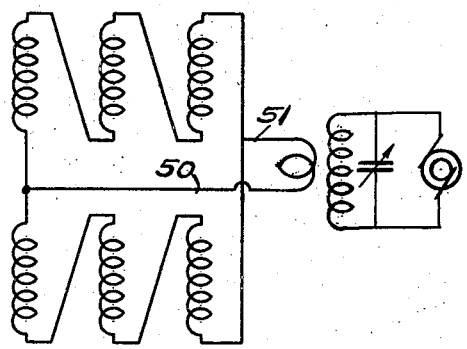
Fig. 5 is a diagram showing one form of the wiring arrangement.

Current usually at high frequency, is supplied to the inductors from bus bars 50 and 51, Figs. 2 and 3, which are connected by conductors 52 to a transformer or other suitable source of current located within the housing 53, of Fig. 1. Since current at relatively high voltage is usually employed, it is customary to connect several of the inductors in series and for that reason the Z formed conductors 54 are employed to connect the lower terminal such as 55 of one inductor to the upper terminal 56 of an adjacent inductor. In the present illustration three of the inductors forming one group are thus connected in series and the two groups are connected in parallel across the bus bars as indicated diagrammatically in Fig. 5.

Since considerable energy is supplied to the inductors, their temperatures will rise at times to harmful proportions unless cooling means is provided. This is accomplished by tubes connected to the coils and to the connecting conductors to permit cooling water to flow therethru. The hollow coils are usually of rectangular form as shown, to give better electrical performance and to provide a construction more compact than would otherwise be possible.

The cooling water to the inductors is supplied from a distributing header or manifold 60. Water under pressure, usually of the order of 60 lbs. per square inch, entering through pipe 72 and thence through pipe 62 and inlet fitting 61 supplies manifold 60. Small rubber hose lines such as 63 are connected to valves 64 which deliver water from manifold 60 to the inductor coils and the connecting conductors. It is customary to connect the hose lines so as to pass the water thru two or more inductors in series when the inductors are small or of medium size. For instance, when water is delivered thru tube 63 it flows up thru coils 40a across thru hose 65 to coil 40b down thru coil 40b then up thru hose 66 to the hollow connecting conductor 54, thru this conductor and then out thru tube 67 which is secured to and serves as outlet for conductor 54. The spent water escapes from tube 67 thru the hose 68 attached thereto and accumulates in the base 13 from which it is pumped under pressure to be again passed thru the coils after its temperature has been reduced by dilution with the cooler water in the basin. Usually there is enough heat loss from the water in the basin to keep the temperature within satisfactory limits.

For the purpose of quenching the article after being heated in the inductor, a quench supply manifold 70 is provided to which quenching fluid, usually water, is supplied by electrically controlled valve 71 from the pressure supply line 72. The manifold 70 has an outlet 73 controlled by a valve 74 for each inductor. This outlet is of relatively large diameter and is directed downwardly toward the piercing end of the projectile as shown in Fig. 4 so that when valve 71, Fig. 1, is opened admitting water under pressure to header 70, the point of the projectile is flooded and the water is spread by the point so that it flows downwardly in a vigorous stream extending peripherally around the projectile dispelling all steam or bubbles of other insulating gases tending to form on the surfaces of the projectile.

It will be observed from the drawing, Fig. 2, that the apparatus is substantially fully enclosed by plates such as 75 which are attached to the frame members and that a door 76 is provided to permit loading and unloading the articles being heat treated.

Since a high rate of production of the projectiles is usually required, means for handling them rapidly in groups is often necessary. To this end the apparatus shown in Figs. 6, 7, 8 and 9 is provided. In this apparatus, the supports 33 are carried by the removable slotted plate 80. Cylinder cover 20 is provided with a mounting 81 for rollers 82 which rollers are free to turn on pins 83 secured in the mounting 81. When the projectiles are assembled on supports 33 as indicated, plate 80 with the projectiles in place thereon is placed on the rollers which engage the sides of the recess cut in the lower side of plate 80 to guide the plate, and the plate is moved longitudinally on the rollers so that lugs 84 enter the slot 85 of the plate and retainers 86 engage its upper surface to hold the plate in alignment. One of the guide rods 35 serves in some cases as means for limiting the movement of the plate and to stop it in such position that each of the six projectiles shown is in coaxial alignment with its corresponding inductor located immediately above it. In other cases retainer 86a is formed as shown to limit the distance plate 80 can be moved. By this arrangement a full load of pieces all mounted on one of these removable plates may be in the machine going through the heating and quenching cycle while one or more similar plates are being unloaded and loaded ready for sliding in place in the machine after the plate carrying the already heat treated pieces has been removed. This makes for greatly increased production.

Since certain machining and assembly operations are sometimes desirable or necessary in the base after heat treatment, it may be required that this end be left relatively soft. This is accomplished in part by arranging the inductor so that the lower coil of section 44, Figs. 3 and 4 does not extend materially below this lower end and in some cases not even down to that end. The heating in this end therefore is much less than in the upper end where inductor section 46 extends considerably beyond the point of the projectile. The fact that the quenching rate in the lower portion of the projectile is much less due to a less vigorous action of the quenching fluid and due to the quenching fluid having become somewhat heated by passing over the heated point before reaching the base further aids in keeping the bases soft.

Figure 10:
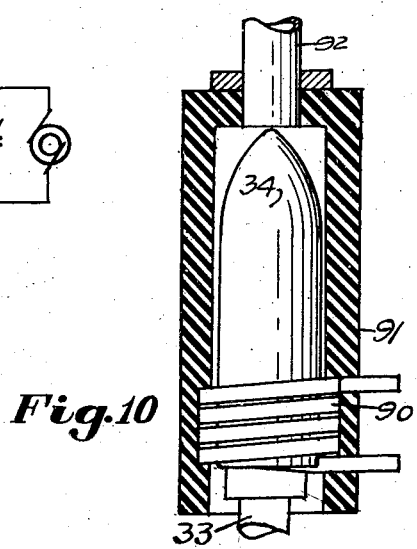
Fig. 10 is a view similar to that of Fig. 4 but showing an inductor disposed to heat the base end only of the article.
Figure 6:
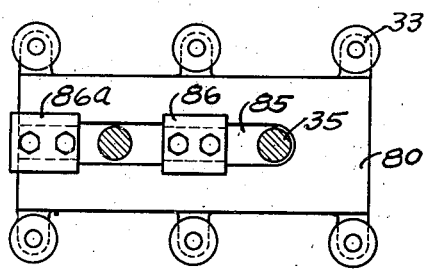
Fig. 6 is a plan view showing the plate for carrying the articles to be heat treated.
Figure 8:
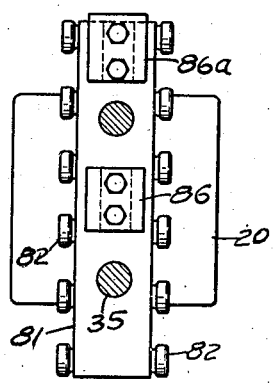
Fig. 8 is a plan view of the support for the article carrying plate, the plate being removed in this view.
Figure 7:
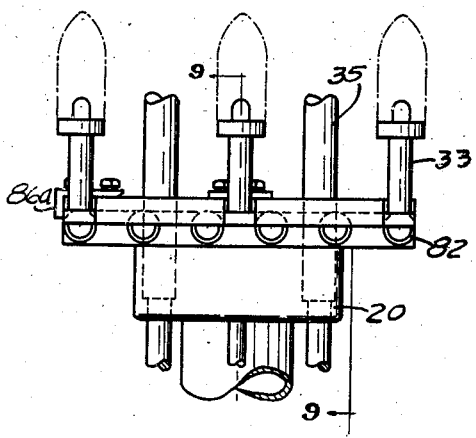
Fig. 7 is a side elevation of the article carrying plate, the plate being shown as assembled on the support.
Figure 9:
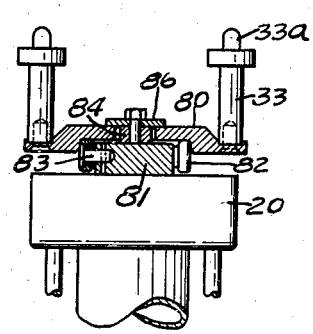
Fig. 9 is an end elevation, partly in section on line 9—9 of the assembly shown in Fig. 7.

When the above described arrangement of the inductor and method of applying the quenching fluid are insufficient to accomplish the desired distribution of hardness, a definite portion of the lower end or base of the projectile is reheated to a definite temperature and to a definite depth. To accomplish this the inductor assembly shown in Fig. 10 is provided. In this the inductor 90 having a limited number of turns is arranged to encircle the base portion only of the projectile. This inductor is carried in a pair of Transite supports 91 assembled substantially the same as those shown in Figs. 3 and 4. After sufficient heating of the base has been completed, cooling fluid is discharged thru tube 92 to prevent heat from migrating into the upper part of the projectile near the point where it is desired to retain high hardness.

Figure 11:
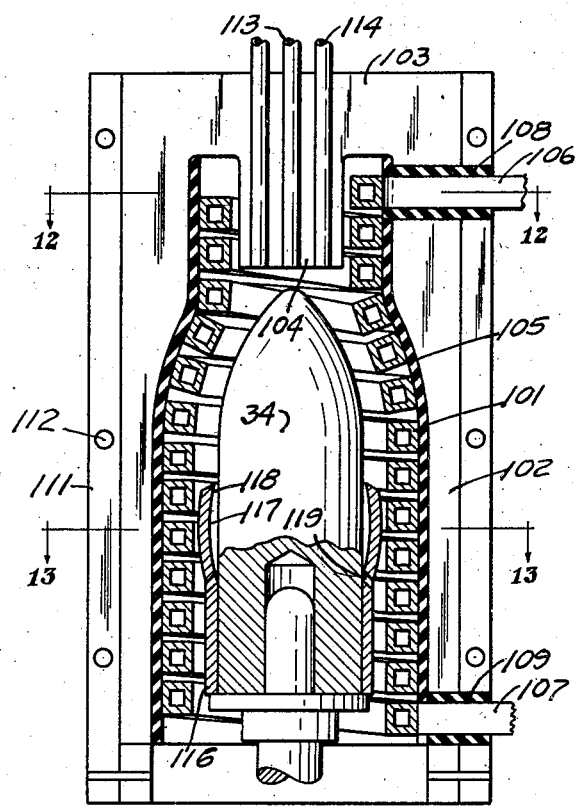
Fig. 11 is an elevation partly in section showing a modification of the apparatus.
Figure 12:
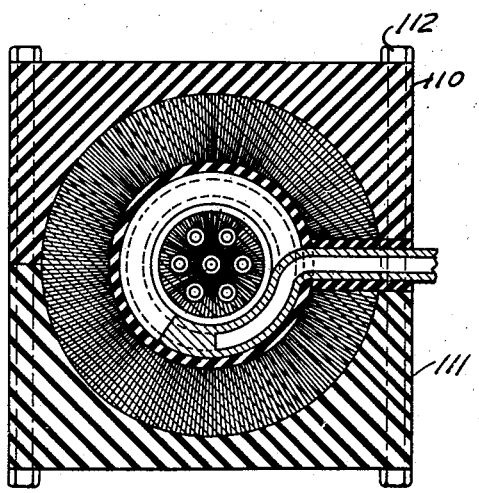
Fig. 12 is a section at 12—12 of Fig. 11.
Figure 13:
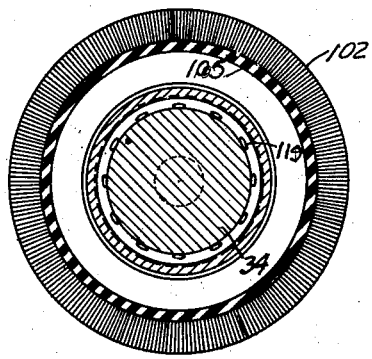
Fig. 13 is a section at 13—13 of Fig. 11.

Further means for controlling the distribution of hardness is illustrated in Figs. 11, 12 and 13. In this modification the inductor 101 is of a form similar to that shown in Figs. 3 and 4, but is substantially surrounded by a laminated enclosure arranged to serve as a magnetic core or circuit of low reluctance. The laminations are shown arranged radially, but may be disposed in other ways. The laminations when assembled form an enclosing structure for the inductor which conforms to the outer shape of the inductor and in addition, has a core section 104 which projects down inside the upper end of the inductor. The laminated structure has an insulated lining 105 to separate the inductor from the core. The terminals 106 and 107 of the inductor are enclosed by insulating bushings 108 and 109 and extend thru passages in an outer wall of the core. The entire structure is enclosed and supported by a pair of complementary insulating blocks 110 and 111 bored out to receive the cylindrical core, the blocks being held in assembled relation with the core and with each other by means of bolts such as 112.

By virtue of the core and the form of the inductor, a high concentration of heating flux in the article 34 is provided, particularly in its upper or piercing end, rapidly heating not only the surface zone but a selected portion of the interior of the projectile at that end to hardening temperature. Quenching is accomplished by projecting water or other fluid thru passages provided by a group of tubes usually comprising a central tube 113 and surrounding tubes 114 passing thru the inwardly projecting core part of the lamination assembly at 104. The center tube 113 is usually somewhat larger than the surrounding tubes to deliver more quenching fluid onto the point of the projectile. Also this center tube is so connected to the source of fluid that it is under higher pressure than the pressure applied to the surrounding tubes. By controlling the size and arrangement of the tubes and the pressures employed, an accurate control of the quenching rate is provided in the point of the projectile. The timing of the quenching is so regulated that fluid is delivered from one or more of the tubes before fluid is delivered from others, further control of the quenching being accomplished by supplying the different tubes with fluid at different temperatures.

As a further means for controlling heating and quenching to reduce hardness in the base portion of the projectile, the tubular shield 116, which is of such size as to fit closely over this base portion, is applied thereto as shown most clearly in Fig. 11. When this shield is made of metal, a large part of induced current which otherwise would flow in and heat the surface zone of the projectile flows in the shield thus reducing the heating in the projectile to a very small amount. This shield also prevents more than a very small amount of quenching fluid from coming in contact with surfaces of the base part of the projectile and thus controls the quenching as well as the heating.

A limited amount of quenching is usually desired along the central part of the cylindrical wall of the projectile. To accomplish this limited quenching the shield 116 is enlarged in this region to provide an annular space 117 for the passage of a small amount of the quenching fluid. The upper annular edge of the shield is formed as indicated at 118 to serve as means for deflecting a desired amount of the fluid and to limit the amount of fluid which is permitted to enter space 117. Passages 119 serve as means for controlling the rate of escape of the quenching fluid.

From the above description it will be seen that the exterior laminated magnetic member in combination with the type and form of inductor described provides an efficient means for rapidly heating the upper or piercing end of the projectile to hardening temperature, that the axially disposed quench tubes provide an efficient and easily controlled quenching apparatus and that the shield 116 serves as a complete means for not only controlling heating but quenching in the surface zones of the central and base parts of the projectile and that by changing from one shield to another the surface zone can be varied as desired as to its shape, depth and degree of hardness.

Figure 14:
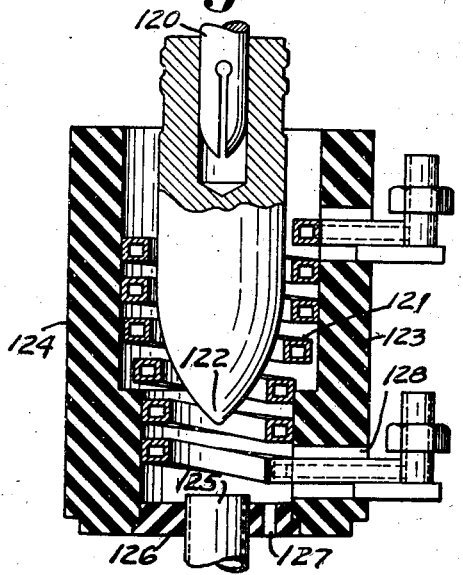
Fig. 14 is a section showing means for heating and quenching the front end of the projectile.

In some instances it is desirable to harden the piercing end of the projectile only, leaving the remainder in its original soft or annealed condition. Our method is adapted to accomplish this hardening and in such instances the inductor is usually formed and assembled as shown in Fig. 14. In this illustration the inductor is substantially the same as the upper part of the inductor shown in Fig. 4 but is shown inverted. This type of inductor is adapted for use either upright or inverted as shown. The heating is substantially the same in either position but different quenching effects are accomplished. In the inverted position the shot is held by a suitable split plug such as 120 or other means engaging the tracer charge recess or other part of the base of the shot. The inductor 121 which encloses the lower or piercing end 122 of the shot is carried by complementary supports 123 and 124. Quenching is accomplished by projecting quenching fluid upwardly from nozzle 125 against the end of the shot. By regulating the flow of the quenching fluid, the rate of quenching is easily controlled, not only of the point of the shot but of the parts extending toward the upper end or base of the shot, the rate of flow of quenching fluid regulating the rate at which heat is removed from the intermediate parts lying between the point and the base. By providing the closure disc 126 through which nozzle 125 projects and by selecting or regulating suitable escape openings such as 127 and 128, the quenching fluid is caused to rise around the shot at a desired rate and to substantially simulate quenching by dipping the end of the shot into a vigorously agitated quenching bath, such quenching having been found particularly advantageous in hardening the cutting or piercing ends of such articles as chisels, punches, bits and a wide variety of articles to which this apparatus is as well adapted as to the hardening of the shot illustrated.

It will be observed that the quenching fluid delivery tubes, such as 73 of Fig. 4 and 125 of Fig. 14, are of substantial diameter approximating one-half of that of the projectile, but that the diameter is small enough to permit the stream of fluid emerging therefrom to pass clearly through the extension, such as 46, of the inductor and to freely impinge on the end of the projectile.

In some cases the apparatus and method described in connection with Fig. 14 are used to advantage where the piece is heated to substantially its entire length, in which cases the heating coils are made to extend as far along the piece as needed to obtain the desired heating.

While the drawings show generally uniform coil spacing, there are often conditions when it is desirable to space the coils non-uniformly in order to produce the desired heating and to produce spacing between the coils for the flow of quenching medium. Such increased spacing is indicated in the coils extending around the lower end of the projectile illustrated in Fig. 4.

Figure 15:
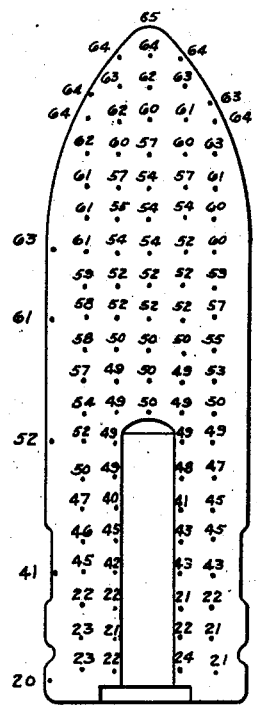
Fig. 15 is a section of a projectile taken on a longitudinal median plane and showing one desired distribution of hardness, cross hatching being omitted for clarity.

Fig. 15 shows a section thru a typical projectile which has been hardened by our process and apparatus. The cross hatching has been omitted to permit the numerals indicating the hardness on the Rockwell C scale to be more easily read. From this it will be seen that the point possesses a maximum hardness of 65 and that the outer surface adjacent thereto is of the order of 64 and that the degree of surface hardness recedes gradually toward the base of the projectile not dropping below 60 until a point nearly half way to the base had been reached from which point the hardness drops rapidly to about 40 a short distance from the base and then drops still more rapidly to about 20 in the immediate vicinity of the base. It will also be observed that the hardness of the interior parts not only decreases in passing from the point toward the base, but that this decrease is more uniform than the decrease of surface hardness which provides for more ductility and more resistance to fracture from impact than would be the case if extremely high hardness were provided in the interior regions near and at a short distance from the point. The soft metal at and near the base facilitates assembling operations.

The projectile from which the section shown in Fig. 15 and above described, was cut, was made from steel of S. A. E. specification #5045A and hardened in apparatus of the type shown in Figs. 3 and 4 and subsequently differentially drawn in apparatus of the type shown in Fig. 10. Further widely varied but controlled results can be obtained by the use of our apparatus and methods as above set forth.

One of the chief advantages of our apparatus and process is the exact duplication of parts. When the material from which the projectiles are made is uniform chemically and physically each of the hardened projectiles is an exact duplicate of the one which preceded it. This is accomplished by using the same amount of power and at the same frequency for each piece and heating and quenching under like conditions and for the same intervals of time. The application of the heating and quenching is timed accurately to a small portion of a second and the operation of switches and valves is automatic being operated by time controlled solenoids.

The raising and lowering of the projectiles is automatic and timed relative to the heating and quenching. The solenoid 130 of Fig. 2 controls the four-way valve 131. When the heating and quenching cycles are started by a manually operated switch or push button, not shown, solenoid 130 shifts a member in valve 131 to admit fluid under pressure from line 132, shown in Fig. 1 thru line 133 to the lower end of cylinder 16 raising the piston therein and plate 32 with projectiles 34 thereon to bring these projectiles into heating position in the inductors. The movement of the member in valve 131 opens a port from line 134 to permit fluid above the piston in cylinder 16 to escape thru passage 135. Upon the termination of heating and quenching of the projectiles within the inductors, the member in valve 31 is timed to move in an opposite direction admitting fluid under pressure thru line 134 to positively lower the projectiles, the fluid under the piston in cylinder 16 being now exhausted through line 133 and outlet passage 135.

From the above it will be observed that the projectile produced by our method possesses ability to penetrate hard and heavy armor and to pass thru such armor substantially intact and to accomplish such penetration at a velocity much below that necessary for the penetration of projectiles produced by the usual methods which gives the projectile a much greater effective range.

Other modes of applying the principle of our invention may be employed instead of the ones explained, change being made as regards the means herein disclosed, as regards the method employed, and as regards the article produced, provided those stated by any of the following claims or their equivalents be employed.

We therefore particularly point out and distinctly claim as our invention:

1. In a method of zone hardening a selected part of a current conducting axially extending article of generally cylindrical form having a generally conical end terminating in a point, the steps comprising inserting the article co-axially into a large diameter portion of a generally cylindrical inductor to heat a cylindrical part of the article and with the point extending into a small diameter cylindrical portion of the inductor, flowing inducing current through the inductor to induce heating current in the article, the small diameter portion of the inductor extending beyond the point to increase a concentration of flux in the point and in point adjacent parts of the article to heat said parts to a higher temperature than cylindrical parts of the article, interrupting the flow of current to the inductor, and then flowing quenching fluid co-axially through the small diameter section of the inductor onto the conical end of the article to vigorously quench the point of said end, the point diverting the fluid into a generally conical layer flowing along generally conical elements of the end, the fluid progressively increasing in temperature as it moves along the surface of the end by absorbing heat from a surface zone of said end, the increasing temperature of the fluid reducing its quenching effect on a part of the article remote from the point to provide less hardness in the remote part than in the point.

2. In a method of zone hardening a selected part of a quench hardenable current conducting and axially extending article of generally cylindrical form having a tapered end terminating in a point, the steps comprising inserting the end of the article substantially co-axially into an enlarged portion of a generally cylindrical inductor and with the point extending into a reduced generally cylindrical portion of the inductor corresponding in shape generally with point adjacent tapered parts of the article, flowing inducing current through the inductor to induce heating current in the article, the reduced portion of the inductor extending beyond the point to increase a concentration of flux in point adjacent parts of the article to heat said parts to a higher temperature than other parts, interrupting the flow of current to the inductor, and then flowing quenching fluid co-axially through the reduced portion of the inductor onto the tapered end of the article to vigorously quench the point of said end, the point diverting the fluid to flow in a layer along surfaces of the tapered end generally axially of the article, the fluid progressively increasing in temperature as it moves along the surfaces of the end by absorbing heat from zones of the surfaces, the increasing temperature of the fluid reducing its quenching effect as it flows toward a part of the article remote from the point to provide less hardness in the remote part than in the point.

3. In a method of zone hardening a selected part of a quench hardenable current conducting and axially extending article of generally cylindrical form having a tapered end terminating in a point, the steps comprising inserting the end of the article substantially co-axially into an enlarged portion of a generally cylindrical inductor and with the point extending into a reduced portion of the inductor corresponding in shape generally with point adjacent tapered parts of the article, flowing inducing current through the inductor to induce heating current in the article, the reduced portion of the inductor extending beyond the point to increase a concentration of flux in point adjacent parts of the article to heat said parts to a higher temperature than other parts, interrupting the flow of current to the inductor, and then flowing a stream of quenching fluid co-axially through the reduced portion of the inductor, a center part of the stream impinging on the point to effect a maximum rate of cooling in the point, outer parts of the stream being diverted by the tapered end to flow in a layer generally axially of the article along the surfaces of the tapered end, the fluid progressively increasing in temperature as it moves along the surfaces of the end to reduce its quenching effect as it approaches end remote parts of the article to provide reduced hardness in the remote parts.

4. In a method of zone hardening a selected part of a quench hardenable current conducting and axially extending article of generally cylindrical form having a tapered end terminating in a point, the steps comprising inserting the end of the article substantially co-axially into an enlarged portion of a generally cylindrical inductor and with the point extending into a reduced generally cylindrical portion of the inductor corresponding in shape generally with point adjacent tapered parts of the article, flowing inducing current through the inductor to induce heating current in the article, the reduced portion of the inductor extending beyond the point to increase a concentration of flux in point adjacent parts of the article to heat said parts to a higher temperature than other parts, interrupting the flow of current to the inductor, and then flowing a stream of quenching fluid co-axially through the reduced portion of the inductor, said stream comprising a plurality of small streams, one of said small streams impinging directly on the point of the article, other of the small streams impinging on and flowing generally axially along the tapered surfaces of the end of the article, the temperature of the streams increasing as the streams move along said surfaces to reduce their quenching effect on surfaces remote from the point of the tapered end.

5. In a method of zone hardening a selected part of a quench hardenable current conducting and axially extending article of generally cylindrical form having a tapered end terminating in a point, the steps comprising inserting the end of the article substantially co-axially into an enlarged portion of a generally cylindrical inductor and with the point extending into a reduced generally cylindrical portion of the inductor corresponding in shape generally with point adjacent tapered parts of the article, flowing inducing current through the inductor to induce heating current in the article, the reduced portion of the inductor extending beyond the point to increase a concentration of flux in point adjacent parts of the article to heat said parts to a higher temperature than other parts, interrupting the flow of current to the inductor, and then flowing a stream of quenching fluid co-axially through the reduced portion of the inductor, a center part of the stream impinging on the point to effect a maximum rate of cooling in the point, outer parts of the stream being diverted by the tapered end to flow in a layer generally axially of the article along the surfaces of the tapered end, the fluid progressively increasing in temperature as it moves along the surfaces of the end to reduce its quenching effect as it approaches end remote parts of the article to provide reduced hardness in the remote parts, and diverting the fluid away from generally cylindrical surfaces of the article as the fluid flows toward a point opposite end of the article to substantially eliminate quenching in the said opposite end.

6. In a method of zone hardening a selected part of a quench hardenable current conducting and axially extending article of generally cylindrical form having a tapered end terminating in a point, the steps comprising inserting the end of the article substantially co-axially into an enlarged portion of a generally cylindrical inductor and with the point extending into a reduced generally cylindrical portion of the inductor corresponding in shape generally with point adjacent tapered parts of the article, flowing inducing current through the inductor to induce heating current in the article, the reduced portion of the inductor extending beyond the point to increase a concentration of flux in point adjacent parts of the article to heat said parts to a higher temperature than other parts, interrupting the flow of current to the inductor, and then flowing a stream of quenching fluid co-axially through the reduced portion of the inductor, a center part of the stream impinging on the point to effect a maximum rate of cooling in the point, outer parts of the stream being diverted by the tapered end to flow in a layer generally axially of the article along the surfaces of the tapered end, a space between the inductor and the article defining thickness of the layer, and a restricted section of the said space regulating a rate of flow of the fluid along surfaces of the article.

7. In a method of zone hardening a selected part of a quench hardenable current conducting and axially extending article of generally cylindrical form having a tapered end terminating in a point, the steps comprising inserting the end of the article substantially co-axially into an enlarged portion of a generally cylindrical inductor and with the point extending downwardly into a reduced generally cylindrical portion of the inductor and through a tapered portion corresponding in shape generally with point adjacent tapered parts of the article, flowing inducing current through the inductor to induce heating current in the article, the reduced portion of the inductor extending beyond the point to increase a concentration of flux in point adjacent parts of the article to heat said parts to a higher temperature than other parts, interrupting the flow of current to the inductor, and then flowing quenching fluid co-axially upwardly through the reduced portion of the inductor onto the tapered end of the article to vigorously quench the point of said end, the point diverting the fluid to flow in a layer along surfaces of the tapered end generally axially of the article, the fluid progressively increasing in temperature as it moves along the surfaces of the end by absorbing heat from zones of the surfaces, the increasing temperature of the fluid reducing its quenching effect as it flows toward a part of the article remote from the point to provide less hardness in the remote part than in the point.

FRANCIS S. DENNEEN.
WILLIAM C. DUNN.

REFERENCES CITED

The following references are of record in the file of this patent:

UNITED STATES PATENTS

| Number | Name | Date |
| --- | --- | --- |
| 2,294,413 | Marshall | Sept. 1, 1942 |
| 2,295,777 | Denneen et al. | Sept. 15, 1942 |

| Number | Name | Date | Number | Name | Date |
|---|---|---|---|---|---|
| 2,024,906 | Bennett | Dec. 17, 1935 | 1,987,458 | Adams | Jan. 8, 1935 |
| 2,079,152 | Clark | May 4, 1937 | 2,179,488 | Dreyfus | Oct. 17, 1939 |
| 1,702,985 | Twyman | Feb. 19, 1929 | 2,146,516 | Stephanson | Feb. 7, 1939 |
| 2,266,176 | Denneen et al. | Dec. 16, 1941 | 2,303,408 | Solderholm | Dec. 1, 1942 |
| 1,878,458 | Blanchet | Sept. 20, 1932 | | | |
| 2,184,280 | Clark | Dec. 26, 1939 | | | |
| 2,223,970 | Stansel | Dec. 3, 1940 | | | |
| 2,249,909 | Pisarev | July 22, 1941 | | | |

FOREIGN PATENTS

| Number | Country | Date |
|---|---|---|
| 6,993 | Great Britain | 1915 |